INVENTOR.
NORMAN A. SMITH
BY
Oberlin & Limbach
ATTORNEYS.

Patented Feb. 20, 1951

2,542,368

UNITED STATES PATENT OFFICE 2,542,368

DRIFTPIN

Norman Arthur Smith, Cleveland Heights, Ohio, assignor to The Cleveland Twist Drill Company, Cleveland, Ohio, a corporation of Ohio Application December 17, 1947, Serial No. 792,245

1 Claim. (Cl. 81—3)

This invention relates, as indicated, to drift pins. Tools of this character are commonly used for the purpose of dislodging tools such as drills, reamers, etc., provided with a tapered shank and which are held in a spindle provided with an axially extending tapered opening into which the shank of the tool is closely fitted. Intersecting the axial opening in the spindle is a diametrical slot which passes through the spindle in the vicinity of the end of the tool supported thereby, and the drift pin is then inserted into this diametrical slot behind the end of the tool shank in the spindle and by virtue of the tapered form of drift pin the latter may be driven into the diametrical slot and the tool shank dislodged axially from the spindle.

When a tool such as a drill has been used for quite some time and especially under heavy-duty service, it becomes quite strongly bound in the spindle supporting and driving it so that considerable force is required to force the drift pin into the diametrical slot in the manner aforesaid for the purpose of removing the tool. This force is usually applied to the drift pin by pounding it with a hammer on its larger end and when the drill or the like is firmly bound in the spindle a blow of considerable force may be required to dislodge it. When the shank of the tool does become dislodged from the spindle this usually occurs suddenly with the result that many times the drift pins previously in use have been forced through the diametrical slot and projected out of such slot with substantial force. This has created a dangerous situation since workmen are usually in the vicinity of machines of this character and there is, accordingly, always the danger of a workman becoming struck and injured with the drift pin which has thus been violently projected through the spindle when the shank of a tool has been dislodged.

It is a principal object of my invention to provide a drift pin whereby this dangerous condition is prevented. Other objects and advantages will become apparent as the following description proceeds.

To the accomplishment of the foregoing and related ends, said invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

Figure 1:
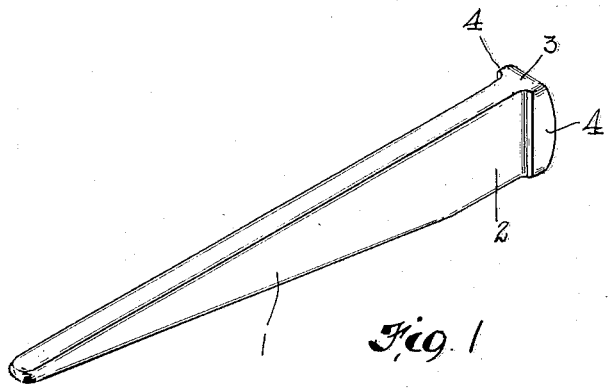
Fig. 1 is a perspective view showing one form of the drift pin construction made in accordance with my invention.

Referring now more specifically to the drawing and more especially to Fig. 1, the drift pin here illustrated as embodying certain of the principles of my invention comprises an elongated body of substantially uniform thickness having a forward portion 1 of gradually tapering width and a rearward portion 2 of substantially uniform width. The rearward portion 2 terminates in a head 3 which is abruptly of substantially greater thickness than the main body of the pin. This increased thickness in the head 3 of the pin is provided by means of integral flange-like projections 4 extending laterally from the body of the pin. The lateral extent of the projections 4 should be sufficient so that the total thickness of the head is at least half again as thick as the thickness of the main body of the pin.

The width and axial extent or length of the diametrical slots aforesaid into and through which the drift pin is projected differ in different spindles. While the length of such slots varies considerably, the width does not vary to nearly the same extent. It will be found that by having the head thickness, as determined by the lateral extent of the projections 4, such that it is at least half again as thick as the thickness of the body of the drift pin, the head will always be wider than the width of the slots in most spindles.

The lateral extensions 4 have the further function of providing a greater head area on the pin which is usually struck with a hammer so that in this area the pin is desirably reinforced and by having a greater striking area the hammer or similar tool used to strike the pin will not as readily slide off the head of the pin as when the thickness of the head is only that of the thickness of the body.

Having the pin provided with an area 2 in which its width is substantially uniform provides certain advantages.

Figure 2:
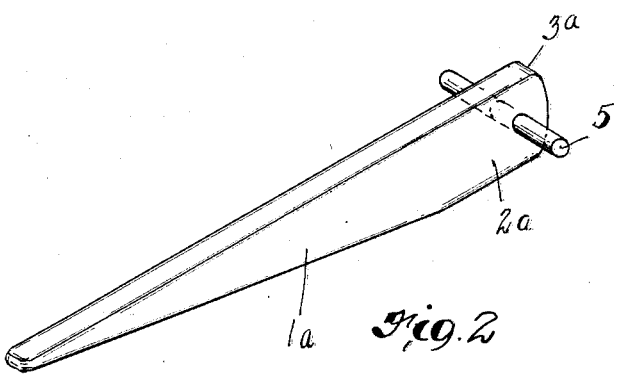
Fig. 2 is a perspective view of an alternative form of such construction.

Instead of forming the pin with laterally extending projections such as 4 illustrated in Fig. 1, certain of the advantages of the construction of Fig. 1 may be secured by the use of a transversely extending bar such as 5 illustrated in Fig. 2. In the drift pin illustrated in Fig. 2, the parts thereof which correspond to the parts of the pin of Fig. 1 have been given similar reference characters with the subscript *a*. The pin of Fig. 2 is formed by forging the body 1, drilling a hole therethrough for the reception of the bar 5, and then inserting the bar 5 and securing it in the opening thereof by any suitable means. In this connection the bar of Fig. 2 is not as advantageous as the head of Fig. 1 because the latter may be made entirely by a simple forging operation.

Figure 3:
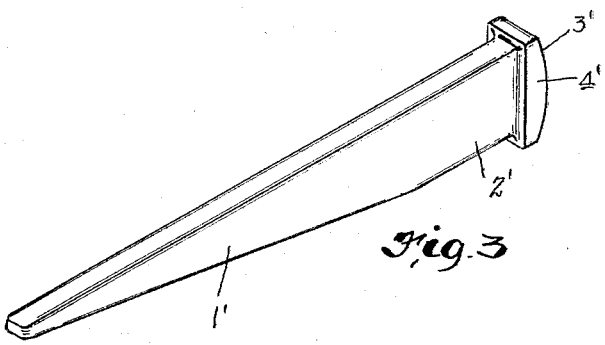
Fig. 3 is a perspective view of another alternative form of my invention.

The alternative form of construction illustrated in Fig. 3 is generally similar to Fig. 1 so that like reference characters with prime marks will be used to designate like parts. The structure of Fig. 3 differs from that of Fig. 1 in that the flanges 4' extend entirely around the head 3 instead of only on the sides thereof as in Fig. 1.

The material from which the pin is made will be determined by the severity of the use to which it will be subjected. For light tools and small sizes, and for use with certain types of machines, the pin might be made of a light metal such as aluminum, magnesium, or alloys thereof. However, for most purposes the pin will be made of steel forged to the desired size and shape and optionally heat-treated to provide a structure which will be able to withstand severe usage.

Other modes of applying the principle of the invention may be employed, change being made as regards the details described, provided the features stated in the following claim, or the equivalent of such, be employed.

I therefore particularly point out and distinctly claim as my invention:

A drift pin for removing taper shank tools from the diametrically slotted spindle of a machine comprising an elongated body of substantially uniform thickness having a forward portion of gradually tapering width and a rearward portion of substantially uniform width, the rearward portion terminating abruptly in an integral head formed by symmetrical flange-like projections each extending laterally from the broad face of said rearward portion coextensive with the width of the body and outwardly therefrom for a distance of at least one-fourth of the thickness of said body, said flanges with said body providing on the larger end of the drift pin a continuous enlarged striking surface and an enlargement which will engage, without wedging, the machine spindle at opposite sides of said slot.

NORMAN ARTHUR SMITH.

REFERENCES CITED

The following references are of record in the file of this patent:

UNITED STATES PATENTS

| Number | Name | Date |
|---|---|---|
| 891,022 | Weaver | June 16, 1908 |
| 1,227,626 | Kelley | May 29, 1917 |
| 1,490,327 | Kerr | Apr. 15, 1924 |
| 1,828,142 | Herdman | Oct. 20, 1931 |